(12) United States Patent
Frivik et al.

(10) Patent No.: US 7,366,056 B2
(45) Date of Patent: Apr. 29, 2008

(54) DEPTH SOUNDING BY ACOUSTIC PINGERS IN A SEISMIC SPREAD

(75) Inventors: Svein Arne Frivik, Oslo (NO); Leendert Combee, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 96 days.

(21) Appl. No.: 11/456,140

(22) Filed: Jul. 7, 2006

(65) Prior Publication Data

US 2008/0008042 A1    Jan. 10, 2008

(51) Int. Cl.
*G01S 3/80* (2006.01)

(52) U.S. Cl. ............... 367/129; 367/130; 367/106; 367/127

(58) Field of Classification Search ............ 367/20, 367/106, 124, 127, 129, 130
See application file for complete search history.

(56) References Cited

U.S. PATENT DOCUMENTS

| 4,312,053 | A | * | 1/1982 | Lipsky | ................... 367/127 |
| 5,321,668 | A | * | 6/1994 | Rouquette | ................ 367/127 |
| 5,668,775 | A | | 9/1997 | Hatteland | |

* cited by examiner

*Primary Examiner*—Ian J. Lobo
(74) *Attorney, Agent, or Firm*—Liangang (Mark) Ye; Jeffrey E. Griffin

(57) ABSTRACT

An embodiment of a method for conducting a bathymetric survey across a seismic spread includes the steps of emitting a signal from a pinger positioned within the seismic spread, measuring the arrival time of a bottom reflection of the signal at a receiver positioned within the seismic spread, measuring the arrival time of a direct arrival of the signal at the receiver, and determining the water depth utilizing the measured arrival times of the signal.

20 Claims, 3 Drawing Sheets

US 7,366,056 B2

DEPTH SOUNDING BY ACOUSTIC PINGERS IN A SEISMIC SPREAD

FIELD OF THE INVENTION

The present invention relates in general to marine seismic surveys and more specifically to systems and methods for creating a bathymetric survey across a seismic spread by utilizing the components of the seismic spread.

BACKGROUND

In marine seismic surveys it is desired to have accurate information about the depth of the water across the seismic spread. The depth information is important so as to avoid entering bottom reflections in the positioning solutions and to remove waterborne multiples in the seismic processing. Heretofore, water depth is commonly obtained along the seismic survey track by an echo sounder mounted on the hull of the vessel. The depth information obtained in this manner is of little value because it only represents a limited area and does not cover the seismic spread. More accurate depth information for generation of charts may be obtained by making multiple passes with a survey vessel utilizing multiple echo sounders or side scan sonar. This method of obtaining a bathymetric chart of an area is expensive and time consuming.

Therefore, it is a desire to provide a system and method of obtaining water depth information across the seismic survey that addresses drawbacks of the prior art methods. It is a still further desire to provide a method of obtaining water depth information across a seismic spread utilizing an acoustic ranging system in a seismic spread.

SUMMARY OF THE INVENTION

Accordingly, methods for obtaining water depth information across a seismic spread are provided. An embodiment of a method for conducting a bathymetric survey across a seismic spread includes the steps of emitting a signal from a pinger (acoustic transducer) positioned within the seismic spread, measuring the arrival time of a bottom reflection of the signal at a receiver positioned within the seismic spread, measuring the arrival time of a direct arrival of the signal at the receiver, and determining the water depth utilizing the measured arrival times of the signal.

Another embodiment of a method for conducting a bathymetric survey across a seismic spread including the steps of emitting a signal from a pinger positioned within the seismic spread, measuring the arrival time of a bottom reflection of the signal at a receiver positioned within the seismic spread, measuring the arrival time of a direct arrival of the signal at the receiver, and determining the water depth according to the equation:

$$H = Z_s + \frac{1}{c}\sqrt{T_{R,i}^2 - T_{D,i}^2}$$

wherein "H" is the water depth, "c" is the speed of sound in the water column, $Z_s$ is the depth of streamer 14 in the water, $T_{R,i}$ is measured arrival time of bottom reflection and $T_{D,i}$ is the measured arrival time of direct arrival.

Another method for conducting a bathymetric survey across a seismic spread includes the steps of towing a seismic spread from a vessel, the seismic spread comprising a plurality of streamers and an acoustic ranging system including a plurality of pingers and receivers connected to the streamers; emitting signals from the pingers; measuring the arrival time of a bottom reflection of the signals at the receivers; measuring the arrival time of a direct arrival of the signals at the receivers; positioning the streamers; and determining the water depth utilizing the measured arrival times of the signals.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1:
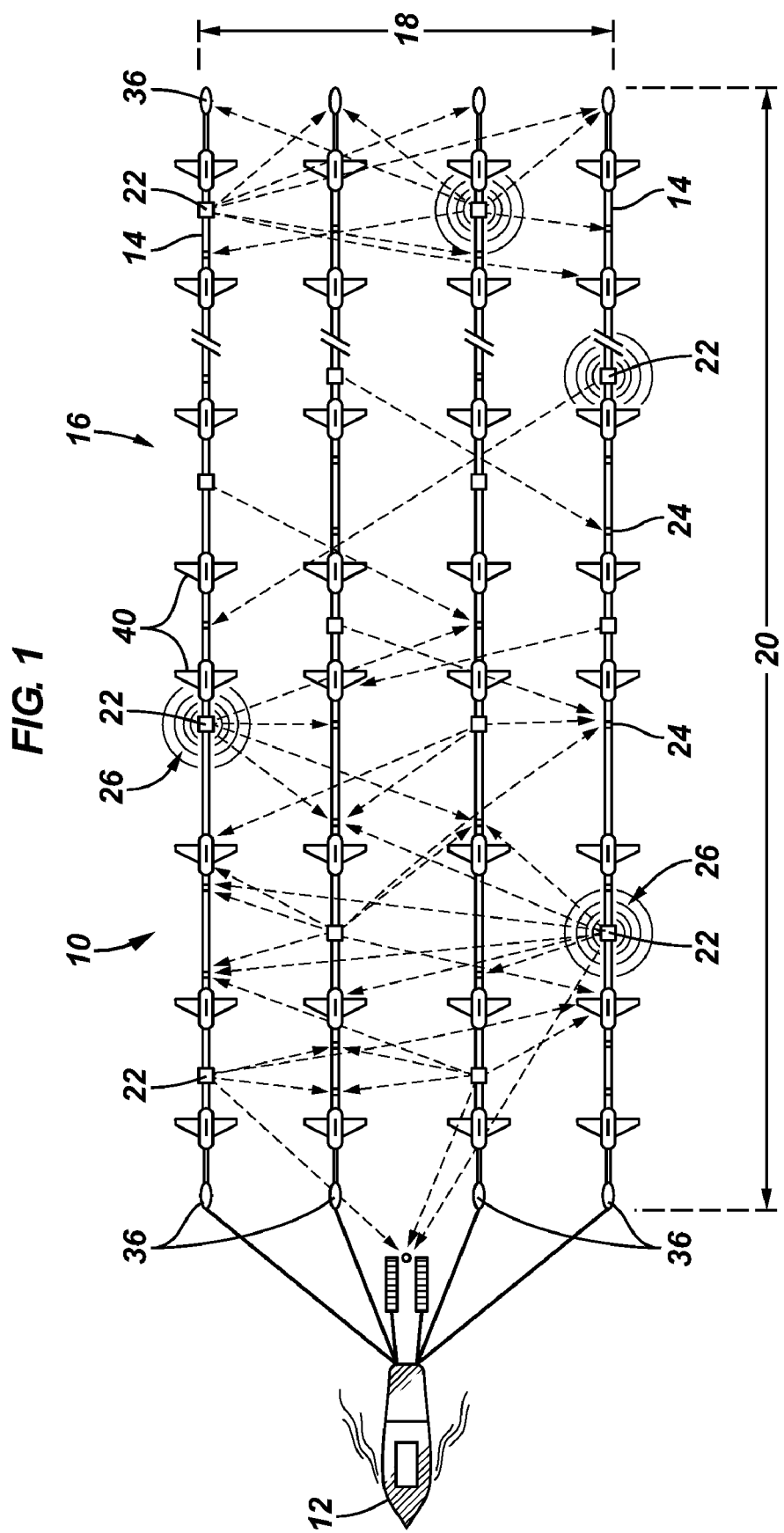
FIG. 1 is a top view of an embodiment of a seismic spread of the present invention.

Refer now to the drawings wherein depicted elements are not necessarily shown to scale and wherein like or similar elements are designated by the same reference numeral through the several views.

FIG. 1 is a top view an embodiment of the depth surveying system of the present invention, generally denoted by the numeral 10. System 10 may be an acoustic ranging system such as described in U.S. Pat. No. 5,668,775. System 10 includes a vessel 12 towing one or more streamers 14. Streamers 14 extend longitudinally from vessel 12 and are spaced from one another laterally to form a seismic spread 16 for conducting a seismic survey. It is not uncommon for seismic spread 16 to extend 300 to 1200 meters laterally, denoted 18, and to extend longitudinally 3 to 12 kilometers, denoted 20.

Seismic spread 16 includes an acoustic ranging system for navigation and positioning purposes. The acoustic ranging system includes a plurality of transmitters referred to as pingers 22 and receivers 24. The acoustic ranging system measures the range between pingers 22 and receivers 24. The range is the travel time of a direct arrival 28 (FIG. 2) of a signal 26 transmitted from a pinger 22 and received by a receiver 24. In some situations, particularly for long ranges in shallow water, the direct signal arrival 28 is weaker than the bottom reflection 30. It is desirable to have bathymetric information across seismic spread 16 to avoid entering bottom reflections in the positioning solutions as well as to remove multiples in the seismic processing.

Figure 2:
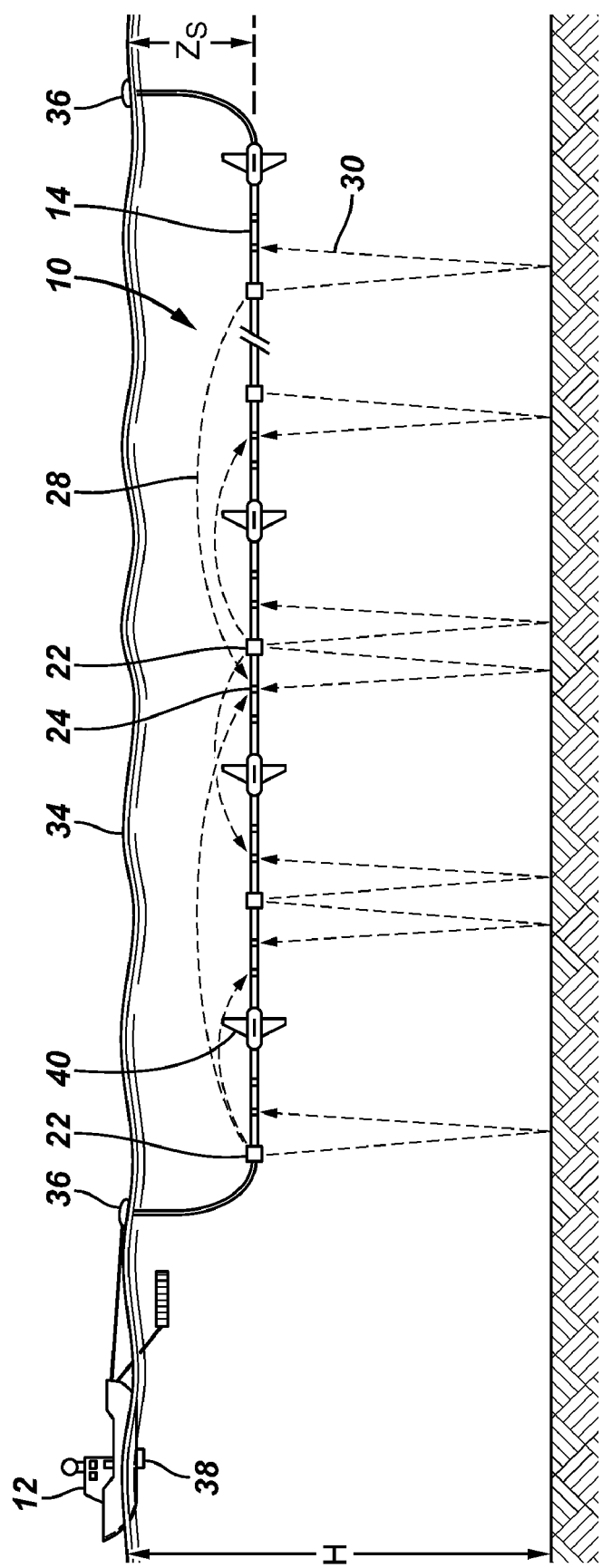
FIG. 2 is a side view of the seismic spread of FIG. 1 illustrating the depth surveying system of the present invention.

FIG. 2 is a side view of system 10 shown in FIG. 1, illustrating a bathymetric survey being conducted across seismic spread 16 (FIG. 1). Streamer 14 is towed behind vessel 12 at a depth $Z_s$ below the surface 34 of the sea. Proximate the distal ends of streamer 14 are global positioning systems 36. Birds 40, carrying instruments to provide dynamic information regarding the position of streamer 14, may also be connected along streamer 14.

Currently, bathymetric information is typically provided via an echo sounder or side scan sonar 38 from vessel 12. This depth information is of limited value since it only covers a limited area around vessel 12 and does not incorporate the area across seismic spread 16. Independent surveys may be conducted across an area in which the seismic survey is going to be provided, however, these surveys are expensive and time consuming. The current invention provides a method and system for conducting an accurate bathymetric survey of the area covered by spread 16 proximate the time the seismic survey is conducted.

With reference to FIGS. 1 and 2, pingers 22 emit signals 26 in all directions. Signal 26 along each streamer 14 and across the plurality of streamers 14 are used for positioning streamers 14. In the present invention signal 28 energy propagating close to vertical, illustrated as reflected signal 30, is utilized to provide bathymetric information across the seismic spread. For each pinger 22, one can utilize data from multiple receivers 24 or from one receiver 24 to determine the water depth H. The depth $Z_s$ that streamer 14 is below surface 34 is known from depth sensors. The depth sensors may be included in birds 40.

Figure 3:
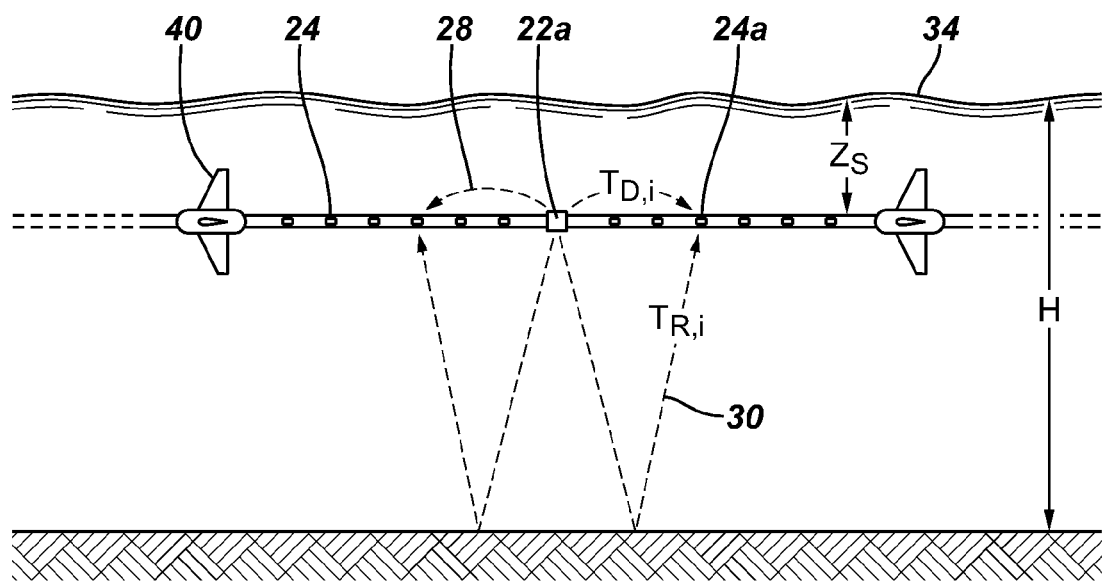
FIG. 3 is a side view of an embodiment of a geometry of the present invention for surveying the water depth across a seismic spread.

FIG. 3 illustrates an embodiment of a geometry of the invention for determination of the water depth across spread 16. Water depth H is provided by equation:

$$H = Z_s + \frac{1}{c}\sqrt{T_{R,i}^2 - T_{D,i}^2}$$

wherein "c" is the speed of sound in the water column, $Z_s$ is depth of streamer 14 below surface 34, $T_{R,i}$ is the arrival time of bottom reflection 30 at receiver 24a from pinger 22a and $T_{D,i}$ is the arrival time of direct arrival 28 at receiver 24a from pinger 22a. The index "i" represents that the measurement may be taken for several offsets or to average the measurements. Further, utilization of measurements of different offsets may be used to estimate the speed of sound in water column H.

Dipping seafloor inline may be addressed by comparing ranges between the distal ends of streamer 14 or by analysis of data from ping to ping. Cross-line dip may be determined by analysis of the relationship between pingers 22 and receivers 24 on neighboring streamers 14.

From the foregoing detailed description of specific embodiments of the invention, it should be apparent that a system and method for obtaining a depth survey across a seismic spread that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method for conducting a bathymetric survey across a seismic spread, the method comprising the steps of:
    emitting a signal from a pinger positioned within the seismic spread;
    measuring the arrival time of a bottom reflection of the signal at a receiver positioned within the seismic spread;
    measuring the arrival time of a direct arrival of the signal at the receiver; and
    determining the water depth of the seismic spread utilizing the measured arrival times of the direct arrival signal and bottom reflection signal.

2. The method of claim 1, further including the steps of:
    measuring the arrival times of the direct arrival and the bottom reflection of the signal at a plurality of receivers; and
    determining the water depth utilizing the measured arrival times of the signal at the plurality of receivers.

3. The method of claim 1, further including determining a dipping seafloor inline.

4. The method of claim 2, further including determining a dipping seafloor inline.

5. The method of claim 1, further including determining a cross-line dip across the seismic spread.

6. The method of claim 2, further including determining a cross-line dip across the seismic spread.

7. The method of claim 3, further including determining a cross-line dip across the seismic spread.

8. The method of claim 4, further including determining a cross-line dip across the seismic spread.

9. A method for conducting a bathymetric survey across a seismic spread, the method comprising the steps of:
    emitting a signal from a pinger positioned within the seismic spread;
    measuring the arrival time of a bottom reflection of the signal at a receiver positioned within the seismic spread;
    measuring the arrival time of a direct arrival of the signal at the receiver; and
    determining the water depth of the seismic spread according to the equation:

$$H = Z_s + \frac{1}{c}\sqrt{T_{R,i}^2 - T_{D,i}^2}$$

wherein "H" is the water depth, "c" is the speed of sound in the water column, $Z_s$ is the depth of a streamer in the water, $T_{R,i}$ is measured arrival time of bottom reflection and $T_{D,i}$ is the measured arrival time of direct arrival.

10. The method of claim 9, further including the steps of:
    measuring the arrival times of the direct arrival and the bottom reflection of the signal at a plurality of receivers; and
    determining the water depth utilizing the measured arrival times of the signal at the plurality of receivers.

11. The method of claim 9, further including determining a dipping seafloor inline.

12. The method of claim 10, further including determining a dipping seafloor inline.

13. The method of claim 9, further including determining a cross-line dip across the seismic spread.

14. The method of claim 10, further including determining a cross-line dip across the seismic spread.

15. The method of claim 11, further including determining a cross-line dip across the seismic spread.

16. The method of claim 12, further including determining a cross-line dip across the seismic spread.

17. A method for conducting a bathymetric survey across a seismic spread, the method comprising the steps of:

towing a seismic spread from a vessel, the seismic spread comprising a plurality of streamers and an acoustic ranging system including a plurality of pingers and receivers connected to the streamers;

emitting signals from the pingers;

measuring the arrival time of a bottom reflection of the signals at the receivers;

measuring the arrival time of a direct arrival of the signals at the receivers;

positioning the streamers; and determining the water depth of the seismic spread utilizing the measured arrival times of the direct arrival signals and bottom reflection signals.

18. The method of claim 17, wherein the water depth is determined according to the equation:

$$H = Z_s + \frac{1}{c}\sqrt{T_{R,i}^2 - T_{D,i}^2}$$

wherein "H" is the water depth, "c" is the speed of sound in the water column, $Z_s$ is the depth of one of the streamers in the water, $T_{R,i}$ is measured arrival time of bottom reflection and $T_{D,i}$ is the measured arrival time of direct arrival.

19. The method of claim 17, wherein the direct arrival signal and bottom reflected signal from each pinger signal is measured from only one of the receivers for determining the water depth.

20. The method of claim 19, wherein the water depth is determined according to the equation:

$$H = Z_s + \frac{1}{c}\sqrt{T_{R,i}^2 - T_{D,i}^2}$$

wherein "H" is the water depth, "c" is the speed of sound in the water column, $Z_s$ is the depth of one of the streamers in the water, $T_{R,i}$ is measured arrival time of bottom reflection and $T_{D,i}$ is the measured arrival time of direct arrival.

* * * * *